United States Patent
Clausse

[11] 3,832,526
[45] Aug. 27, 1974

[54] ELECTRICALLY HEATED KETTLES WITH A HEAT CONTROL

[75] Inventor: Georges Jean Louis-Marie Clausse, Ialeham, England

[73] Assignee: Belling and Company Limited, Enfield, Middlesex, England

[22] Filed: June 18, 1973

[21] Appl. No.: 370,757

[30] Foreign Application Priority Data
June 19, 1972 Great Britain.................. 28691/72

[52] U.S. Cl................ 219/441, 99/281, 219/437
[51] Int. Cl............................................ F27d 11/02
[58] Field of Search .......... 219/429, 430, 433, 435, 219/436, 438, 439, 441, 442, 494, 521, 437; 99/280, 281

[56] References Cited
UNITED STATES PATENTS

| | | |
|---|---|---|
| 2,535,731 | 12/1950 | Goodenrath...................... 219/433 |
| 3,130,288 | 4/1964 | Monaco et al................. 219/439 X |
| 3,138,698 | 6/1964 | Wells et al........................ 219/441 |
| 3,369,105 | 2/1968 | Wheeler............................ 219/441 |
| 3,539,774 | 11/1970 | Thornton........................... 219/442 |
| 3,678,246 | 7/1972 | Blachly et al..................... 219/437 |
| 3,725,641 | 4/1973 | Tilp................................... 219/433 |

Primary Examiner—Volodymyr Y. Mayewsky
Attorney, Agent, or Firm—Wenderoth, Lind & Ponack

[57] ABSTRACT

An electric kettle having a body comprising a base, a side wall integral with the base, the base and the side wall being of plastics material capable of withstanding boiling water, and an upper rim member secured on the upper edge of the side wall. An electric heating element operatively positioned within the kettle and a metal plate bridge member separating said electric heating element from the plastic base.

5 Claims, 4 Drawing Figures

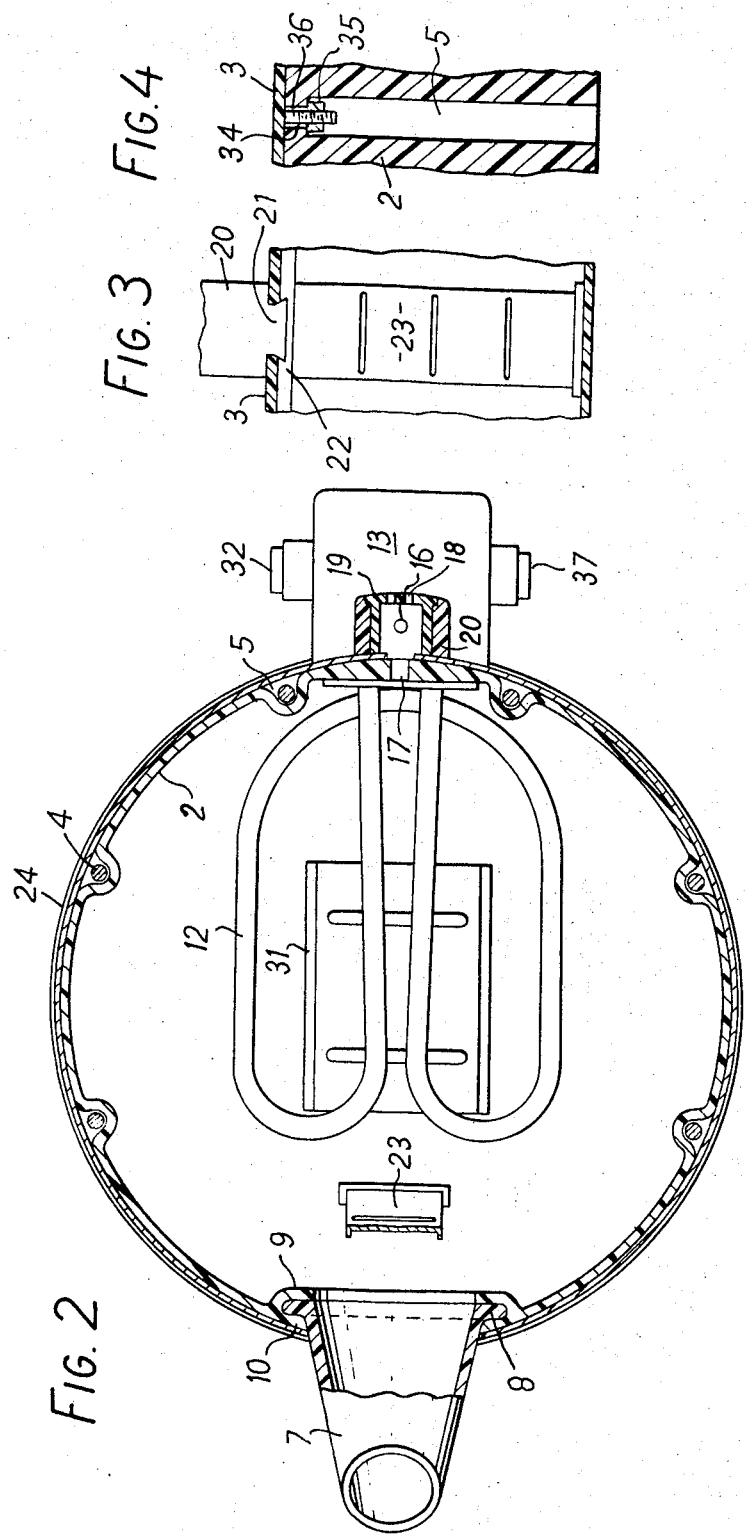

1

ELECTRICALLY HEATED KETTLES WITH A HEAT CONTROL

This invention relates to electric kettles and more particularly to electric kettles made of plastics materials.

It is an object of this invention to provide a construction which enables a kettle to be assembled from a few parts each produced by a simple moulding operation.

According to the invention there is provided an electric kettle having a body comprising a base, a side wall integral with the base, the base and the side wall being of plastics material capable of withstanding boiling water, and an upper rim member secured on the upper edge of the side wall. The base and rim member may be formed each with a circumferential groove in which may be received an edge of a sheet of decorative material which surrounds the side wall. Preferably the spout is moulded as a separate part on a flat panel which is secured on a corresponding flat face of the side wall by forming the side wall with parallel lips which embrace opposite edges of the panel as it is slid therebetween.

The invention will further be described with reference to the accompanying drawing, of which:

FIG. 2 is a horizontal section on the line 11—11 in FIG. 1;

FIG. 3 is a section taken on the line 111—111 in FIG. 1; and

FIG. 4 is a diagram illustrating an alternative mode of fixing the rim member.

Figure 1:
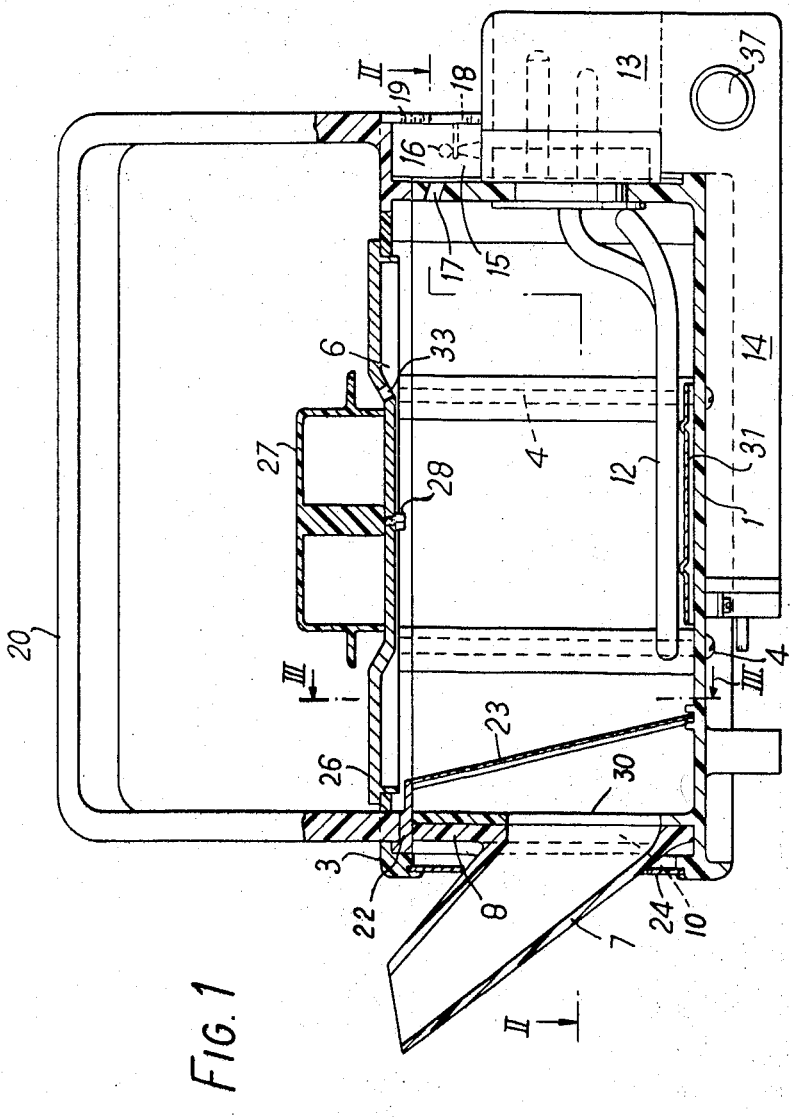
FIG. 1 is a central vertical section of a kettle in accordance with the invention.

As shown the kettle body comprises a base 1 having an integral side wall 2 moulded of Noryl, a plastics material which withstands boiling water. On the upper edge of the side wall is a rim member 3 which is secured thereon by a series of bolts 4 which are passed upwardly from the underside of the base 1 through longitudinal grooves 5 formed in the side wall to engage inserts located in correspondly positioned bosses 6 formed in the interior of the rim member 3.

The spout 7 is formed as a separate moulding of Noryl on a flat panel 8 which is received on and held against a flat portion 9 of the side wall 2 by channels 10 which embrace the edges of the panel as it is slid between them. The channels 10 extend down both sides of an outlet water hole 30 in the side wall and continue around the base of the hole to join together. The subsequent securing of the rim 3 locks the panel 8 in place with the spout hole in the panel registered with the hole 30 formed in the side wall. Sealing is effected by silicone sealant in the channels 10.

The opposite side of the side wall 2 is formed with a hole for receiving the boss of a plug-in heating element 12. A stainless steel bridge member 31 is set in the centre of the base to stand away therefrom. The purpose of this bridge member is to prevent the heating element 12 from coming into direct contact with the base as a result of misalignment during fitment. The bridge member thus ensures that heat from the element 12 cannot destroy the base. The heating element 12 is secured in position by a nut not shown. This nut is covered by a casing 13 which on the one hand acts as a shroud for the heating element terminals and is formed with an opening for receiving a plug, and on the other hand to accommodate equipment for switching off the heating element if this element is energised when the kettle is empty or when the water boils. Part of the equipment is contained in that part 14 of the casing which extends below the base of the kettle. The upper part of the casing 13 is formed with a chamber 15 in which is housed a temperature sensitive element 16. This chamber opens into the interior of the kettle through a hole 17 formed in the side wall and to atmosphere through slots 18 formed in its outer wall 19. Element 16 responds when steam issues from hole 17 and in order to help prevent water splashing on to the element 16 and impeding its function, the hole 17 is angled downwardly as shown.

The kettle has a push-button switch 32 which on being depressed, closes a heater switch which applies current to the heater element 12. When the water boils or if the kettle should be dry the control circuit opens the heater switch. A buzzer is provided which may be switched in or out by another push-button switch 37. When switched in the buzzer sounds when switch 32 is open, namely when power is applied to the kettle and before switch 32 is switched on and after the kettle has boiled or if it is dry.

The handle 20 of the kettle is secured at the spout end by forming it with a dovetail 21 (FIG. 3) which extends through a slot or hole in the rim member 3 and is received in a complimentary shaped slot in the upper surface of a small bracket 22 which lies under the rim member 3 and has a depending flange 23 which carries markings in the form of slots indicating water levels corresponds to specified volumes in the kettle. Once the bracket 22 is pinned or adhered in position this end of the handle is secured.

The other end of the handle 20 is recessed to accommodate the outer wall 19 of the chamber 15 and is formed with a dovetail slot which is wider at its upper end and in which the chamber 15 of corresponding shape is received. This end of the handle is thus secured by the attachment of the casing 13 to the kettle.

For decorative purposes the side wall of the kettle is encircled by a strip 24 of decorative material. At its centre this strip is faced with a hole through which the spout 7 passes and its free ends are clamped under the nut which ensures the heating element. As can be seen in FIG. 1 the longitudinal edges of the decorative strip 24 are received in grooves formed in the base 1 and rim member 3 so that the strip is secured in position once the rim member has been attached to the base by the screws 4. The use of the decorative strip, which may be stainless steel or plastics material, gives a double-skin construction, thus providing a degree of thermal insulation. The lid 26 has steam vent holes 33 which allow steam to issue from beneath the handle. The handle, numeral 27 of the lid, is hollow so that it does not become excessively hot. The dimensions of the vent holes are large enough to allow steam to issue without lifting the lid and small enough to create a back pressure which causes a good flow of steam down hole 17. The lid is made of metal — typically chromium-plated brass. The handle 27 is attached to the lid 26 by means of a nut 28 which screws onto a stud projecting from the handle.

Referring to FIG. 4 there is shown an alternative method of fixing the rim member 3 to the side wall 2. In the FIG. 4 arrangement the rim member has threaded studs 36 depending from it and inserted through holes 34 at the tops of the grooves 5. Nuts 35 are passed up the grooves 5 and are screwed onto the studs to secure the rim member.

The improved kettle as described above with reference to the drawings comprises a number of parts all designed to be moulded of a suitable plastics material with the aid of comparatively simple tools, which parts can then be simply and inexpensively assembled.

I claim:

1. In an electrical kettle having a body, an electric heating element operatively positioned within the body, an electrical socket located on the body for receiving an electric plug and electrically connected to the electric heating element and means for controlling the electric heating element operatively connected thereto, the improvement which comprises:
    a base member constructed of a plastics material capable of withstanding boiling water, said base member having a metal plate bridge member set therein which stands away from the base and being effective to prevent direct contact between said electric heating element and said base member;
    a cylindrical side wall integral with said base member and constructed of a plastics material capable of withstanding boiling water;
    an upper rim member secured on an upper edge of said cylindrical side wall and having an aperture therein;
    a lid adapted to cover said aperture;
    a handle having both ends connected to said upper rim member and extending over said aperture; and
    a spout extending from said side wall and communicating with the interior of the kettle body.

2. An electric kettle as claimed in claim 1 wherein the base and the rim member each project beyond the side wall and have corresponding circumferential grooves in their projecting portions, and further comprising a sheet of decorative material which surrounds the side wall, the sheet having edges accommodated in the grooves in the base and the rim member.

3. An electric kettle as claimed in claim 1 wherein the side wall has bolt holes extending from top to bottom and bolts are passed through the bolt holes to secure the rim member.

4. An electric kettle as claimed in claim 1 wherein the side wall has holes therein extending from top to bottom and the rim member has studs formed thereon, the holes have reduced portions into which project the studs and nuts are threaded on to the studs by being passed up the holes thereby securing the rim member.

5. An electric kettle as claimed in claim 1 wherein the spout is moulded as a separate part of plastics material capable of withstanding boiling water, the spout has a flat panel, the side wall has an aperture therein, there are channels formed about the aperture in the side wall, and said flat panel of the spout fits said channels and is secured therein.

* * * * *